US011519808B2

(12) United States Patent
Bagwell et al.

(10) Patent No.: US 11,519,808 B2
(45) Date of Patent: Dec. 6, 2022

(54) FLUID MONITORING SYSTEM

(71) Applicant: General Electric Company, Schenectady, NY (US)

(72) Inventors: Joshua Adam Bagwell, Taylors, SC (US); Alberto José Negroni, Simpsonville, SC (US); Jonathan Carl Thatcher, Bradford, MA (US); John Paul Metz, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 218 days.

(21) Appl. No.: 17/085,560

(22) Filed: Oct. 30, 2020

(65) Prior Publication Data

US 2022/0136921 A1 May 5, 2022

(51) Int. Cl.
  *G01M 3/04* (2006.01)
  *F02C 7/00* (2006.01)
  *G01M 15/14* (2006.01)

(52) U.S. Cl.
  CPC .............. *G01M 3/04* (2013.01); *F02C 7/00* (2013.01); *G01M 15/14* (2013.01)

(58) Field of Classification Search
  CPC ........ F02C 7/22; F02C 7/222; F05D 2260/80; F05D 2220/323; G01M 3/025; G01M 3/26; G01M 3/40
  See application file for complete search history.

(56) References Cited

U.S. PATENT DOCUMENTS

| | | | |
|---|---|---|---|
| 6,761,629 B1 * | 7/2004 | Parker | F02C 9/00 114/211 |
| 7,698,898 B2 * | 4/2010 | Eluripati | B01F 25/23 60/785 |
| 8,079,220 B2 * | 12/2011 | Haggerty | F02C 7/222 60/776 |
| 9,140,189 B2 * | 9/2015 | Romig | F02C 7/22 |
| 10,260,425 B2 * | 4/2019 | Crowley | F02C 9/28 |
| 10,563,594 B2 * | 2/2020 | Harper | F02C 9/28 |
| 2011/0100096 A1 * | 5/2011 | Szepek | G01M 3/2876 73/40.5 R |
| 2014/0102179 A1 * | 4/2014 | Ekanayake | F01D 21/003 73/40.5 R |
| 2018/0106197 A1 * | 4/2018 | Harper | F02C 9/263 |
| 2021/0139040 A1 * | 5/2021 | Ganiger | G01N 33/30 |

FOREIGN PATENT DOCUMENTS

DE  102018123515 A1 *  3/2019  .............. F02C 7/222

* cited by examiner

*Primary Examiner* — David A. Rogers
(74) *Attorney, Agent, or Firm* — Fletcher Yoder, P.C.

(57) ABSTRACT

A fluid monitoring system includes a controller configured to determine that a value of at least one fluid property of a fluid is greater than a threshold value, and to control actuators to identify which fluid source has the fluid with the value of the at least one fluid property greater than the threshold value. Each actuator is configured to drive a respective crossover valve between a first position and a second position to direct the fluid from a respective first fluid source to a first manifold or a second manifold and to direct the fluid from a respective second fluid source to the first manifold or the second manifold. In addition, the first manifold is configured to direct the fluid to a first sensor assembly, and the second manifold is configured to direct the fluid to a second sensor assembly.

20 Claims, 6 Drawing Sheets

FLUID MONITORING SYSTEM

BACKGROUND

The subject matter disclosed herein relates to a fluid monitoring system.

Gas turbine systems typically include at least one gas turbine engine having a compressor, a combustion section, a turbine, and a fuel source. The combustion section includes multiple combustor cans, and each combustor can is configured to receive fuel from the fuel source and compressed air from the compressor. For example, each combustor can may have a head end configured to receive the compressed air from the compressor. Fuel nozzle(s) may inject fuel into the compressed air as the compressed air flows through the combustor can. The fuel-air mixture is then ignited, and the resultant combustion gases are directed toward the turbine.

During operation of the gas turbine system, fuel may enter the head end of a combustor can due to fuel leakage within the gas turbine system. Accordingly, a hydrocarbon sensor may be fluidly coupled to the head end of each combustor can to detect the fuel leakage. Unfortunately, due to the cost of hydrocarbon sensors and the number of combustor cans within the gas turbine engine, utilizing hydrocarbons sensors to detect fuel leakage may significantly increase the cost of the gas turbine system.

BRIEF DESCRIPTION

Certain embodiments commensurate in scope with the original claims are summarized below. These embodiments are not intended to limit the scope of the claimed subject matter, but rather these embodiments are intended only to provide a brief summary of possible forms of the claimed subject matter. Indeed, the claimed subject matter may encompass a variety of forms that may be similar to or different from the embodiments set forth below.

In accordance with an embodiment of the present disclosure, a fluid monitoring system includes a controller having a memory and a processor. The controller is configured to determine that a value of at least one fluid property of a fluid is greater than a threshold value, and the controller is configured to control actuators to identify which fluid source has the fluid with the value of the at least one fluid property greater than the threshold value in response to determining that the value of the at least one fluid property is greater than the threshold value. Each actuator is configured to drive a respective crossover valve between a first position and a second position. Each crossover valve is configured to direct the fluid from a respective first fluid source to a first manifold and to direct the fluid from a respective second fluid source to a second manifold while the crossover valve is in the first position, and to direct the fluid from the respective first fluid source to the second manifold and to direct the fluid from the respective second fluid source to the first manifold while the crossover valve is in the second position. In addition, the first manifold is configured to receive the fluid and to direct the fluid to a first sensor assembly, and the second manifold is configured to receive the fluid and to direct the fluid to a second sensor assembly.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
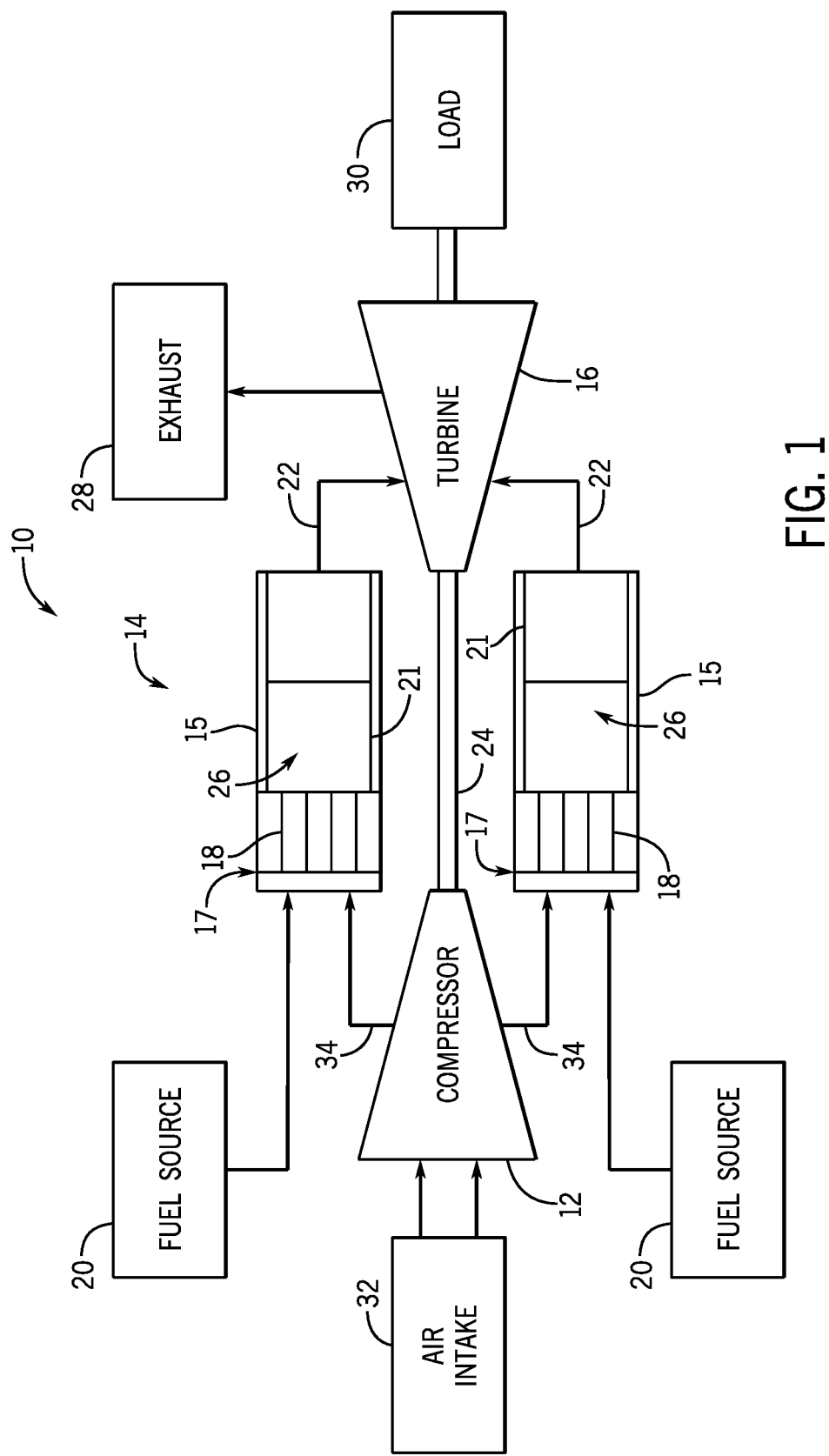
FIG. 1 is a block diagram of an embodiment of a gas turbine system, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The disclosed embodiments are directed toward a fluid monitoring system configured to detect hydrocarbons within a head end of each combustor can of a combustion section. As discussed in detail below, the fluid monitoring system includes a first manifold configured to receive fluid (e.g., air) and to direct the fluid to a first sensor assembly (e.g., including a hydrocarbon sensor). In addition, the fluid monitoring system includes a second manifold configured to receive the fluid and to direct the fluid to a second sensor assembly (e.g., including a hydrocarbon sensor). The fluid monitoring system also includes multiple crossover valves. Each crossover valve is configured to direct the fluid from a respective first fluid source (e.g., head end of a respective first combustor can) to the first manifold and to direct the fluid from a respective second fluid source (e.g., head end of a respective second combustor can) to the second manifold while the crossover valve is in a first position. Each crossover valve is also configured to direct the fluid from the respective first fluid source to the second manifold and to direct the fluid from the respective second fluid source to the first manifold while the crossover valve is in a second position.

During operation of the gas turbine system, the fluid monitoring system may detect fuel leakage into the head end of each combustor can. For example, while the crossover valves are in the first position, the first sensor assembly may detect fuel within any of the head ends of the respective first combustor cans, and the second sensor assembly may detect fuel within any of the head ends of the respective second combustor cans. Accordingly, the fluid monitoring system may continuously or substantially continuously monitor the head ends for fuel leakage. In addition, the crossover valves may be controlled to identify the head end that is receiving the fuel from the fuel leak. For example, in response to determining that leaked fuel is present within a head end, each crossover valve may be sequentially transitioned to the other of the first position and the second position. The head end that is experiencing a fuel leak may be identified in response to a change in detection among the first and second sensor assemblies. Accordingly, the head end that is receiving leaked fuel may be identified with two sensor assemblies, as compared to one sensor assembly for each combustor can, thereby reducing the cost of the gas turbine system. In addition, because the sensor assemblies are continuously/substantially continuously monitoring the head ends of the combustor cans for fuel, a fuel leak within the gas turbine system may be detected almost immediately, as compared to a fluid monitoring system that cyclically directs air from each combustor can to a single sensor assembly.

Turning now to the drawings, FIG. 1 is a block diagram of an embodiment of a gas turbine system 10. The gas turbine system 10 includes a compressor 12, a combustion section 14, and a turbine 16. The combustion section 14 includes multiple combustor cans 15 (e.g., 2, 4, 6, 8, 10, 12, 14, 16, etc.). Each combustor can 15 includes a head end 17, which receives compressed air from the compressor 12, and fuel nozzles 18, which route a fuel into the combustor can 15 from a fuel source 20, such as a fuel skid. The fuel source 20 may supply a liquid fuel and/or a gaseous fuel, such as natural gas and/or syngas generated from a gasification system (e.g., a gasifier that produces syngas from a feedstock such as coal). The combustor cans 15 of the combustion section 14 ignite and combust the fuel with the compressed air from the compressor 12. The fuel combusts with the compressed air in a combustion chamber 26 of each combustor can 15, thereby producing hot pressurized combustion gases 22 (e.g., exhaust). An inner wall 21 of each combustor can 15 extends circumferentially about the combustion chamber 26 and routes the combustion gases 22 into the turbine 16.

Turbine blades within the turbine 16 are coupled to a shaft 24 of the gas turbine system 10, which may also be coupled to several other components throughout the gas turbine system 10. As the combustion gases 22 flow against and between the turbine blades of the turbine 16, the turbine blades are driven in rotation, which causes the shaft 24 to rotate. Eventually, the combustion gases 22 exit the gas turbine system 10 via an exhaust outlet 28. Further, in the illustrated embodiment, the shaft 24 is coupled to a load 30, which is powered via the rotation of the shaft 24. The load 30 may be any suitable device that generates power via the rotational output of the gas turbine system 10, such as an electrical generator, a propeller of an airplane, or other load.

The compressor 12 of the gas turbine system 10 includes compressor blades. The compressor blades within the compressor 12 are coupled to the shaft 24 and rotate as the shaft 24 is driven to rotate by the turbine 16, as discussed above. As the compressor blades rotate within the compressor 12, the compressor 12 compresses air (or any suitable oxidant) received from an air intake 32 to produce pressurized air 34. The pressurized air 34 is then fed into each combustor can 15 (e.g., from a downstream end of the combustor can to the head end to cool the combustion liner). As mentioned above, the fuel nozzles 18 deliver the pressurized air 34 and fuel into the combustion chamber 26 for combustion to drive rotation of the turbine 16.

Figure 2:
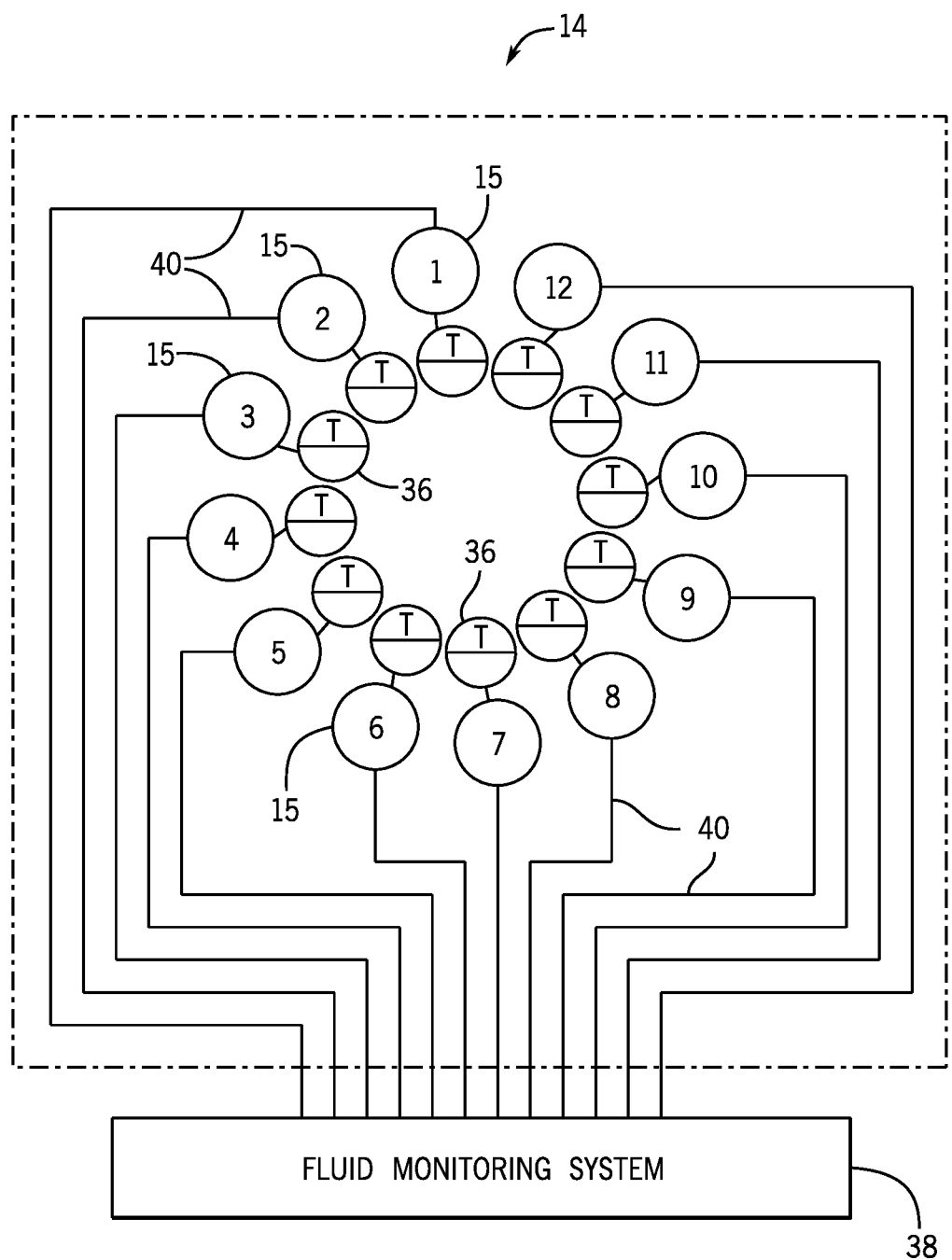
FIG. 2 is a schematic diagram of an embodiment of a combustion section that may be employed within the gas turbine system of FIG. 1, in accordance with an aspect of the present disclosure.

FIG. 2 is a schematic diagram of an embodiment of a combustion section 14 that may be employed within the gas turbine system of FIG. 1. In the illustrated embodiment, the combustion section 14 includes twelve combustor cans 15 distributed circumferentially about a central axis of the combustion section 14. While the combustion section includes twelve combustor cans in the illustrated embodiment, in other embodiments, the combustion section may include more or fewer combustor cans (e.g., 4, 6, 8, 10, 14, 16, 18, 20, or any other suitable number of combustor cans). Furthermore, while the cans are circumferentially distributed about the central axis of the combustion section in the illustrated embodiment, in other embodiments, the combustor cans may be arranged in any other suitable pattern within the combustion section. Each combustor can 15 may include one or more fuel nozzles, an igniter, a liner, a casing, other suitable components, or a combination thereof.

As previously discussed, each combustor can 15 includes a head end 17 (e.g., including a volume around the fuel nozzles), which receives compressed air from the compressor, and fuel nozzle(s) 18, which route a fuel into the combustor can 15 from a fuel source 20. The combustor cans 15 of the combustion section 14 ignite and combust the fuel with the compressed air 34 from the compressor 12. The fuel nozzle(s) 18 may premix the fuel and compressed air 34 (e.g., to create a fuel-air mixture) prior to delivery into the combustion chamber 26, and/or the fuel nozzle(s) 18 may separately deliver the fuel and compressed air 34 into the combustion chamber 26 for a diffusion combustion.

In the illustrated embodiment, a thermocouple 36 is coupled to each combustor can 15 and is configured to output a signal indicative of a temperature within the respective can 15 (e.g., within the head end of the can, within a fuel nozzle of the can, within the combustion chamber of the can, etc.). While a single thermocouple is coupled to each can in the illustrated embodiment, in other embodiments, multiple thermocouples may be coupled to at least one can (e.g., to monitor different portions of the can). Furthermore, one or more of the illustrated thermocouples may be omitted.

In the illustrated embodiment, a fluid monitoring system 38 is fluidly coupled to the combustion section 14. As illustrated, a fluid passage 40 extends from each combustor can 15 to the fluid monitoring system 38. As discussed in detail below, the fluid monitoring system 38 includes a first manifold configured to receive air from certain fluid passages 40 and to direct the air to a first hydrocarbon sensor assembly. In addition, the fluid monitoring system 38 includes a second manifold configured to receive air from other fluid passages 40 and to direct the air to a second hydrocarbon sensor assembly.

The fluid monitoring system 38 also includes crossover valves, in which each crossover valve is configured to direct the air from a respective first combustor can 15 to the first manifold and to direct the air from a respective second combustor can 15 to the second manifold while the crossover valve is in a first position. Furthermore, each crossover valve is configured to direct the air from the respective first combustor can 15 to the second manifold and to direct the fluid from the respective second combustor can 15 to the first manifold while the crossover valve is in a second position. Each hydrocarbon sensor assembly is configured to detect fuel within the air, thereby facilitating detection of a fuel leak within the gas turbine system. In addition, the positions of the crossover valves may be controlled to facilitate identification of the location of the fuel leak among the combustor cans 15 of the combustion section 14.

Figure 3:
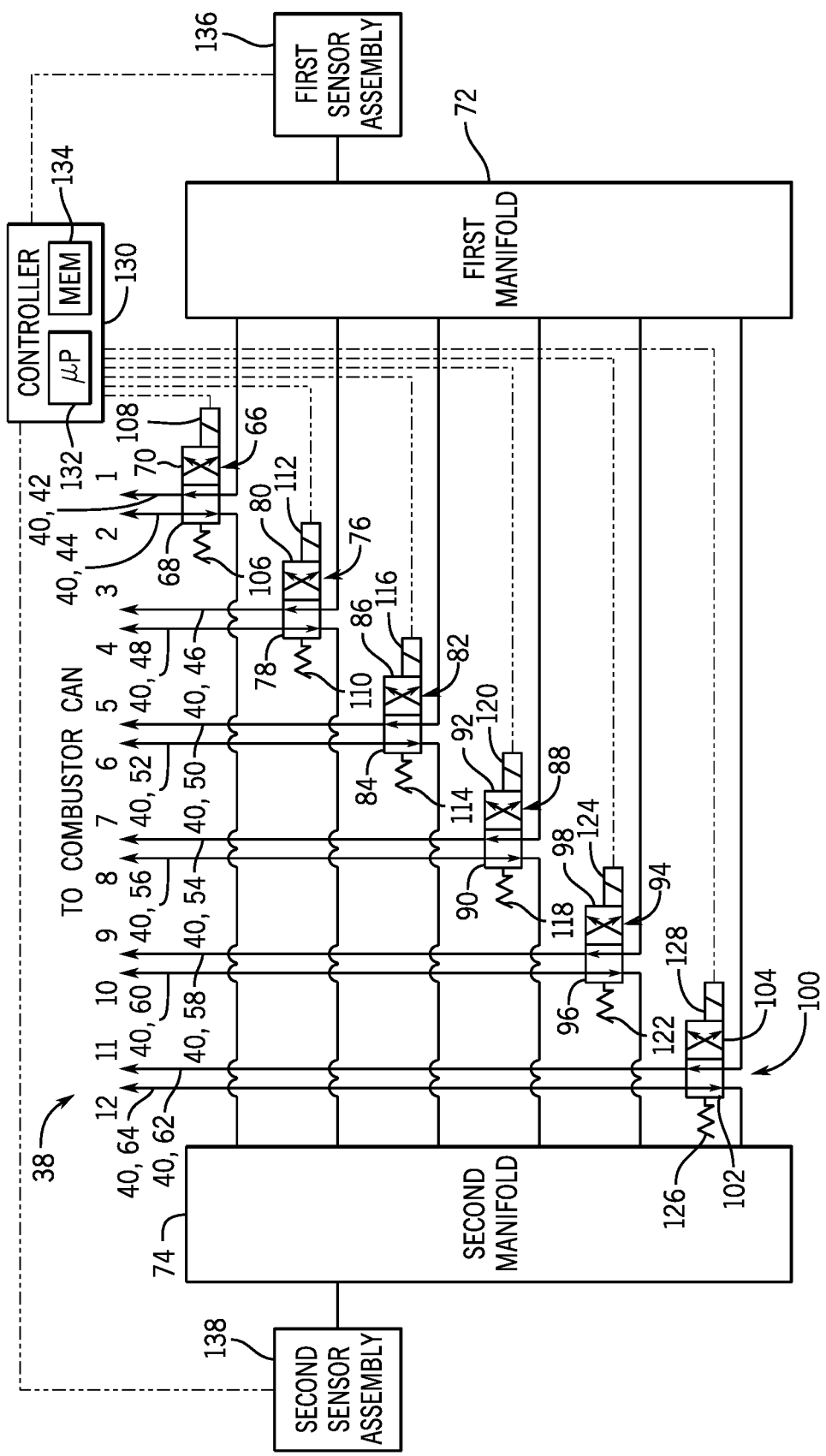
FIG. 3 is a schematic diagram of an embodiment of a fluid monitoring system that may be fluidly coupled to the combustion section of FIG. 2, in accordance with an aspect of the present disclosure.

FIG. 3 is a schematic diagram of an embodiment of a fluid monitoring system 38 that may be fluidly coupled to the combustion section 14 of FIG. 2. As previously discussed, each combustor can 15 of the combustion section 14 is fluidly coupled to the fluid monitoring system 38 by a respective fluid passage 40. In the illustrated embodiment, the combustion section 14 has twelve combustor cans 15. Accordingly, twelve fluid passages 40 extend from the fluid monitoring system 38 to the respective combustor cans 15. As illustrated, a first fluid passage 42 extends to combustor can 1, a second fluid passage 44 extends to combustor can 2, a third fluid passage 46 extends to combustor can 3, a fourth fluid passage 48 extends to combustor can 4, a fifth fluid passage 50 extends to combustor can 5, a sixth fluid passage 52 extends to combustor can 6, a seventh fluid passage 54 extends to combustor can 7, an eighth fluid passage 56 extends to combustor can 8, a ninth fluid passage 58 extends to combustor can 9, a tenth fluid passage 60 extends to combustor can 10, an eleventh fluid passage 62 extends to combustor can 11, and a twelfth fluid passage 64 extends to combustor can 12.

The fluid monitoring system 38 includes a first crossover valve 66 fluidly coupled to the first fluid passage 42 and to the second fluid passage 44. In the illustrated embodiment, the first crossover valve 66 is a four-way crossover valve having a first position 68 and a second position 70. While the first crossover valve 66 is in the first position 68, the first crossover valve 66 establishes a fluid connection between the first fluid passage 42 and a first manifold 72, and the first crossover valve 66 establishes a fluid connection between the second fluid passage 44 and a second manifold 74. In addition, while the first crossover valve 66 is in the second position 70, the first crossover valve 66 establishes a fluid connection between the first fluid passage 42 and the second manifold 74, and the first crossover valve 66 establishes a fluid connection between the second fluid passage 44 and the first manifold 72. Accordingly, the first crossover valve 66 is configured to direct the air from combustor can 1 (e.g., respective first fluid source, respective first combustor can) to the first manifold 72 and to direct the air from combustor can 2 (e.g., respective second fluid source, respective second combustor can) to the second manifold 74 while the first crossover valve 66 is in the first position 68, and to direct the air from combustor can 1 to the second manifold 74 and to direct the air from combustor can 2 to the first manifold 72 while the first crossover valve 66 is in the second position 70.

Furthermore, the fluid monitoring system 38 includes a second crossover valve 76 fluidly coupled to the third fluid passage 46 and to the fourth fluid passage 48. In the illustrated embodiment, the second crossover valve 76 is a four-way crossover valve having a first position 78 and a second position 80. While the second crossover valve 76 is in the first position 78, the second crossover valve 76 establishes a fluid connection between the third fluid passage 46 and the first manifold 72, and the second crossover valve 76 establishes a fluid connection between the fourth fluid passage 48 and the second manifold 74. In addition, while the second crossover valve 76 is in the second position 80, the second crossover valve 76 establishes a fluid connection between the third fluid passage 46 and the second manifold 74, and the second crossover valve 76 establishes a fluid connection between the fourth fluid passage 48 and the first manifold 72. Accordingly, the second crossover valve 76 is configured to direct the air from combustor can 3 (e.g., respective first fluid source, respective first combustor can) to the first manifold 72 and to direct the air from combustor can 4 (e.g., respective second fluid source, respective second combustor can) to the second manifold 74 while the second crossover valve 76 is in the first position 78, and to direct the air from combustor can 3 to the second manifold 74 and to direct the air from combustor can 4 to the first manifold 72 while the second crossover valve 76 is in the second position 80.

In addition, the fluid monitoring system 38 includes a third crossover valve 82 fluidly coupled to the fifth fluid passage 50 and to the sixth fluid passage 52. In the illustrated embodiment, the third crossover valve 82 is a four-way crossover valve having a first position 84 and a second position 86. While the third crossover valve 82 is in the first position 84, the third crossover valve 82 establishes a fluid connection between the fifth fluid passage 50 and the first manifold 72, and the third crossover valve 82 establishes a fluid connection between the sixth fluid passage 52 and the second manifold 74. In addition, while the third crossover valve 82 is in the second position 86, the third crossover valve 82 establishes a fluid connection between the fifth fluid passage 50 and the second manifold 74, and the third crossover valve 82 establishes a fluid connection between the sixth fluid passage 52 and the first manifold 72. Accordingly, the third crossover valve 82 is configured to direct the air from combustor can 5 (e.g., respective first fluid source, respective first combustor can) to the first manifold 72 and to direct the air from combustor can 6 (e.g., respective second fluid source, respective second combustor can) to the second manifold 74 while the third crossover valve 82 is in the first position 84, and to direct the air from combustor can 5 to the second manifold 74 and to direct the air from combustor can 6 to the first manifold 72 while the third crossover valve 82 is in the second position 86.

The fluid monitoring system 38 also includes a fourth crossover valve 88 fluidly coupled to the seventh fluid passage 54 and to the eighth fluid passage 56. In the illustrated embodiment, the fourth crossover valve 88 is a four-way crossover valve having a first position 90 and a second position 92. While the fourth crossover valve 88 is in the first position 90, the fourth crossover valve 88 establishes a fluid connection between the seventh fluid passage 54 and the first manifold 72, and the fourth crossover valve 88 establishes a fluid connection between the eighth fluid passage 56 and the second manifold 74. In addition, while the fourth crossover valve 88 is in the second position 92, the fourth crossover valve 88 establishes a fluid connection between the seventh fluid passage 54 and the second manifold 74, and the fourth crossover valve 88 establishes a fluid connection between the eighth fluid passage 56 and the first manifold 72. Accordingly, the fourth crossover valve 88 is configured to direct the air from combustor can 7 (e.g., respective first fluid source, respective first combustor can) to the first manifold 72 and to direct the air from combustor can 8 (e.g., respective second fluid source, respective second combustor can) to the second manifold 74 while the fourth crossover valve 88 is in the first position 90, and to direct the air from combustor can 7 to the second manifold 74 and to direct the air from combustor can 8 to the first manifold 72 while the fourth crossover valve 88 is in the second position 92.

In addition, the fluid monitoring system 38 includes a fifth crossover valve 94 fluidly coupled to the ninth fluid passage 58 and to the tenth fluid passage 60. In the illustrated embodiment, the fifth crossover valve 94 is a four-way crossover valve having a first position 96 and a second position 98. While the fifth crossover valve 94 is in the first position 96, the fifth crossover valve 94 establishes a fluid connection between the ninth fluid passage 58 and the first manifold 72, and the fifth crossover valve 94 establishes a fluid connection between the tenth fluid passage 60 and the second manifold 74. In addition, while the fifth crossover valve 94 is in the second position 98, the fifth crossover valve 94 establishes a fluid connection between the ninth fluid passage 58 and the second manifold 74, and the fifth crossover valve 94 establishes a fluid connection between the tenth fluid passage 60 and the first manifold 72. Accordingly, the fifth crossover valve 94 is configured to direct the air from combustor can 9 (e.g., respective first fluid source, respective first combustor can) to the first manifold 72 and to direct the air from combustor can 10 (e.g., respective second fluid source, respective second combustor can) to the second manifold 74 while the fifth crossover valve 94 is in the first position 96, and to direct the air from combustor can 9 to the second manifold 74 and to direct the air from combustor can 10 to the first manifold 72 while the fifth crossover valve 94 is in the second position 98.

Furthermore, the fluid monitoring system 38 includes a sixth crossover valve 100 fluidly coupled to the eleventh fluid passage 62 and to the twelfth fluid passage 64. In the illustrated embodiment, the sixth crossover valve 100 is a four-way crossover valve having a first position 102 and a second position 104. While the sixth crossover valve 100 is in the first position 102, the sixth crossover valve 100 establishes a fluid connection between the eleventh fluid passage 62 and the first manifold 72, and the sixth crossover valve 100 establishes a fluid connection between the twelfth fluid passage 64 and the second manifold 74. In addition, while the sixth crossover valve 100 is in the second position 104, the sixth crossover valve 100 establishes a fluid connection between the eleventh fluid passage 62 and the second manifold 74, and the sixth crossover valve 100 establishes a fluid connection between the twelfth fluid passage 64 and the first manifold 72. Accordingly, the sixth crossover valve 100 is configured to direct the air from combustor can 11 (e.g., respective first fluid source, respective first combustor can) to the first manifold 72 and to direct the air from combustor can 12 (e.g., respective second fluid source, respective second combustor can) to the second manifold 74 while the sixth crossover valve 100 is in the first position 102, and to direct the air from combustor can 11 to the second manifold 74 and to direct the air from combustor can 12 to the first manifold 72 while the sixth crossover valve 100 is in the second position 104.

An actuator is coupled to each respective crossover valve, and the actuator is configured to drive the respective crossover valve between the first position and the second position. In the illustrated embodiment, each actuator includes a biasing element (e.g., spring) and a solenoid. As illustrated, a first biasing element 106 and a first solenoid 108 are coupled to the first crossover valve 66. The first biasing element 106 is configured to urge the first crossover valve 66 toward the first position 68, and the first solenoid 108 is configured to drive the first crossover valve 66 to the second position 70. Accordingly, while the first solenoid 108 is activated, the first solenoid 108 drives the first crossover valve 66 to the second position 70, and while the first solenoid 108 is deactivated, the first biasing element 106 drives the first crossover valve 66 to the first position 68.

In addition, a second biasing element 110 and a second solenoid 112 are coupled to the second crossover valve 76. The second biasing element 110 is configured to urge the second crossover valve 76 toward the first position 78, and the second solenoid 112 is configured to drive the second crossover valve 76 to the second position 80. Accordingly, while the second solenoid 112 is activated, the second solenoid 112 drives the second crossover valve 76 to the second position 80, and while the second solenoid 112 is deactivated, the second biasing element 110 drives the second crossover valve 76 to the first position 78.

Furthermore, a third biasing element 114 and a third solenoid 116 are coupled to the third crossover valve 82. The third biasing element 114 is configured to urge the third crossover valve 82 toward the first position 84, and the third solenoid 116 is configured to drive the third crossover valve 82 to the second position 86. Accordingly, while the third solenoid 116 is activated, the third solenoid 116 drives the third crossover valve 82 to the second position 86, and while the third solenoid 116 is deactivated, the third biasing element 114 drives the third crossover valve 82 to the first position 84.

A fourth biasing element 118 and a fourth solenoid 120 are coupled to the fourth crossover valve 88. The fourth biasing element 118 is configured to urge the fourth crossover valve 88 toward the first position 90, and the fourth solenoid 120 is configured to drive the fourth crossover valve 88 to the second position 92. Accordingly, while the fourth solenoid 120 is activated, the fourth solenoid 120 drives the fourth crossover valve 88 to the second position 92, and while the fourth solenoid 120 is deactivated, the fourth biasing element 118 drives the fourth crossover valve 88 to the first position 90.

In addition, a fifth biasing element 122 and a fifth solenoid 124 are coupled to the fifth crossover valve 94. The fifth biasing element 122 is configured to urge the fifth crossover valve 94 toward the first position 96, and the fifth solenoid 124 is configured to drive the fifth crossover valve 94 to the second position 98. Accordingly, while the fifth solenoid 124 is activated, the fifth solenoid 124 drives the fifth crossover valve 94 to the second position 98, and while the fifth solenoid 124 is deactivated, the fifth biasing element 122 drives the fifth crossover valve 94 to the first position 96.

Furthermore, a sixth biasing element 126 and a sixth solenoid 128 are coupled to the sixth crossover valve 100. The sixth biasing element 126 is configured to urge the sixth crossover valve 100 toward the first position 102, and the sixth solenoid 128 is configured to drive the sixth crossover valve 100 to the second position 104. Accordingly, while the sixth solenoid 128 is activated, the sixth solenoid 128 drives the sixth crossover valve 100 to the second position 104, and while the sixth solenoid 128 is deactivated, the sixth biasing element 126 drives the sixth crossover valve 100 to the first position 102.

In the illustrated embodiment, each solenoid is communicatively coupled to a controller 130, and the controller 130 is configured to control the solenoids to control the positions of the crossover valves. In certain embodiments, the controller 130 is an electronic controller having electrical circuitry configured to control the solenoids. In the illustrated embodiment, the controller 130 includes a processor, such as the illustrated microprocessor 132, and a memory device 134. The controller 130 may also include one or more storage devices and/or other suitable components. The processor 132 may be used to execute software, such as software for controlling the solenoids, and so forth. Moreover, the processor 132 may include multiple microprocessors, one or more "general-purpose" microprocessors, one or more special-purpose microprocessors, and/or one or more application specific integrated circuits (ASICS), or some combination thereof. For example, the processor 132 may include one or more reduced instruction set (RISC) processors.

The memory device 134 may include a volatile memory, such as random access memory (RAM), and/or a nonvolatile memory, such as read-only memory (ROM). The memory device 134 may store a variety of information and may be used for various purposes. For example, the memory device 134 may store processor-executable instructions (e.g., firmware or software) for the processor 132 to execute, such as instructions for controlling the solenoids, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the solenoids, etc.), and any other suitable data.

While each actuator in the illustrated embodiment includes a biasing member configured to urge the respective crossover valve to the first position and a solenoid configured to drive the respective crossover valve to the second position, in other embodiments, the fluid monitoring system may include at least one other suitable type of actuator configured to control the position of the respective crossover valve(s). For example, in certain embodiments, at least one actuator may include a biasing member configured to urge the respective crossover valve(s) to the second position and a solenoid configured to drive the respective crossover valve(s) to the first position. Furthermore, in certain embodiments, at least one actuator may include a first solenoid configured to drive the respective crossover valve(s) to the first position and a second solenoid configured to drive the respective crossover valve(s) to the second position. In such embodiments, each solenoid may be communicatively coupled to the controller to enable the controller to control the position of the respective crossover valve(s). In addition, while each actuator disclosed above includes a solenoid configured to control the position of the respective crossover valve, in certain embodiments, at least one actuator may include one or more other suitable type(s) of actuating device(s), such as pneumatic actuating device(s), hydraulic actuating device(s), electromechanical actuating device(s), other suitable type(s) of actuating device(s), or a combination thereof.

In the illustrated embodiment, the first manifold 72 is fluidly coupled to a first sensor assembly 136, and the second manifold 74 is fluidly coupled to a second sensor assembly 138. Each sensor assembly is configured to output a signal indicative of at least one fluid property of a fluid. In certain embodiments, the at least one fluid property includes a concentration of hydrocarbons within the fluid (e.g., the air received from the head ends of the combustor cans). As illustrated, the controller 130 is communicatively coupled to the first sensor assembly 136 and to the second sensor assembly 138. The controller 130 is configured to determine a first value of the at least one fluid property (e.g., hydrocarbon concentration) of the fluid (e.g., air) flowing through the first manifold 72 based on feedback from the first sensor assembly 136, and the controller 130 is likewise configured to determine a second value of the at least one fluid property (e.g., hydrocarbon concentration) of the fluid (e.g., air) flowing through the second manifold 74 based on feedback from the second sensor assembly 138. In addition, the controller 130 is configured to compare each value of the at least one fluid property (e.g., hydrocarbon concentration) to a threshold value to determine whether the at least one fluid property exceeds a threshold value.

By way of example, during operation of the gas turbine system, the controller 130 may detect fuel leakage into the head end(s) of the combustor can(s). For example, while the crossover valves are in the first position, air flows from the respective first combustor cans to the first sensor assembly 136 via the first manifold 72, and air flows from the respective second combustor cans to the second sensor assembly 138 via the second manifold 74. In the illustrated embodiment, the respective first combustor cans include odd-numbered combustor cans (i.e., combustor cans 1, 3, 5, 7, 9, and 11), and the respective second combustor cans include even-numbered combustor cans (i.e., combustor cans 2, 4, 6, 8, 10, and 12). Accordingly, while the crossover valves are in the first position, air flows from combustor cans 1, 3, 5, 7, 9, and 11 to the first manifold 72, and air flows from combustor cans 2, 4, 6, 8, 10, and 12 to the second manifold 74. As such, the first sensor assembly 136 monitors the concentration of hydrocarbons within the head ends of combustor cans 1, 3, 5, 7, 9, and 11, and the second sensor assembly 138 monitors the concentration of hydrocarbons within the head ends of combustor cans 2, 4, 6, 8, 10, and 12.

If the controller 130 determines that the first value of the hydrocarbon concentration within the first manifold 72 is greater than a hydrocarbon threshold value, the controller 130 may identify a fuel leak within one of combustor cans 1, 3, 5, 7, 9, and 11, and if the controller 130 determines that the second value of the hydrocarbon concentration within the second manifold 74 is greater than the hydrocarbon threshold value, the controller 130 may identify a fuel leak within one of combustor cans 2, 4, 6, 8, 10, and 12. Accordingly, the controller 130 may continuously/substantially continuously (e.g., within the sampling rate of the sensor assemblies/controller) monitor the head ends of the combustor cans for fuel leakage.

In the illustrated embodiment, the controller 130 is configured to selectively control the actuators to identify the combustor can head end that is receiving fuel from the fuel leak. For example, in response to determining that fuel/hydrocarbons are present within one head end (e.g., determining that the first value of the hydrocarbon concentration or the second value of the hydrocarbon concentration is greater than the hydrocarbon threshold value), the controller 130 may sequentially instruct each actuator to drive the respective crossover valve to the other of the first position and the second position. In addition, the controller may identify which combustor can head end is receiving fuel from the fuel leak in response to identifying a change in detection of the hydrocarbon concentration that is greater than the hydrocarbon threshold value among the first and second sensor assemblies.

By way of example, the head end of combustor can 3 may receive fuel from a fuel leak. Accordingly, while the crossover valves are in the first position, the controller 130 may determine that the first value of the hydrocarbon concentration within the first manifold 72 is greater than the hydrocarbon threshold value. The controller 130 may then sequentially instruct each actuator to drive the respective crossover valve from the first position to the second position. For example, the controller 130 may instruct the first solenoid 108 to drive the first crossover valve 66 from the first position 68 to the second position 70, thereby directing the air from combustor can 1 to the second manifold 74 and directing the air from combustor can 2 to the first manifold 72. Because fuel is not leaking into combustor can 1 or combustor can 2, the controller 130 may not identify a change in detection of the hydrocarbon concentration that is greater than the hydrocarbon threshold value among the first and second sensor assemblies.

Next, the controller 130 may instruct the second solenoid 112 to drive the second crossover valve 76 from the first position 78 to the second position 80, thereby directing the air from combustor can 3 to the second manifold 74 and directing the air from combustor can 4 to the first manifold 72. Because fuel is leaking into combustor can 3, the controller 130 may identify a change in detection of the hydrocarbon concentration that is greater than the hydrocarbon threshold value among the first and second sensor assemblies. For example, the controller 130 may determine that the first value of the hydrocarbon concentration within the first manifold 72 is less than the hydrocarbon threshold value, and the second value of the hydrocarbon concentration within the second manifold is greater than the hydrocarbon threshold value. Because the flow of air from the head end of combustor can 3 switched from flowing into the first manifold 72 to flowing into the second manifold 74 in response to changing the position of the second crossover valve 76, the controller may identify that fuel is leaking into the head end of combustor can 3.

By way of further example, in response to determining that fuel/hydrocarbons are present within one head end (e.g., determining that the first value of the hydrocarbon concentration or the second value of the hydrocarbon concentration is greater than the hydrocarbon threshold value), the controller 130 may sequentially instruct successive groups of actuators to drive the respective crossover valves to the other of the first position and the second position to more quickly identify the combustor can receiving leaked fuel. In addition, the controller may identify which combustor can head end is receiving fuel from the fuel leak in response to identifying a change in detection of the hydrocarbon concentration that is greater than the hydrocarbon threshold value among the first and second sensor assemblies.

For example, the controller may sequentially instruct a group of two actuators to drive the respective crossover valves to the other of the first position and the second position. In response to identifying a change in detection of the hydrocarbon concentration that is greater than the hydrocarbon threshold value among the first and second sensor assemblies, the controller may sequentially instruct each actuator within the group to drive the respective crossover valve to the other of the first position and the second position. The controller may then identify which combustor can head end is receiving fuel from the fuel leak in response to identifying a change in detection of the hydrocarbon concentration that is greater than the hydrocarbon threshold value among the first and second sensor assemblies.

By way of example, the head end of combustor can 3 may receive fuel from a fuel leak. Accordingly, while the crossover valves are in the first position, the controller 130 may determine that the first value of the hydrocarbon concentration within the first manifold 72 is greater than the hydrocarbon threshold value. The controller 130 may then sequentially instruct groups of two actuators to drive the respective crossover valves from the first position to the second position. For example, the controller 130 may instruct the first solenoid 108 to drive the first crossover valve 66 from the first position 68 to the second position 70, thereby directing the air from combustor can 1 to the second manifold 74 and directing the air from combustor can 2 to the first manifold 72. The controller 130 may concurrently (e.g., simultaneously) instruct the second solenoid 112 to drive the second crossover valve 76 from the first position 78 to the second position 80, thereby directing the air from combustor can 3 to the second manifold 74 and directing the air from combustor can 4 to the first manifold 72. The controller 130 may identify a change in detection of the hydrocarbon concentration that is greater than the hydrocarbon threshold value among the first and second sensor assemblies, which indicates that a leak is occurring within one of combustor cans 1 through 4.

For example, after the repositioning of the valves, the controller 130 may determine that the first value of the hydrocarbon concentration within the first manifold 72 is less than the hydrocarbon threshold value, and the second value of the hydrocarbon concentration within the second manifold is greater than the hydrocarbon threshold value. Such values indicate that a leak is occurring within combustor can 1 and/or combustor can 3. The controller 130 may then sequentially instruct each of the first and second actuators 108, 112 to drive the respective crossover valve 66, 76 to the other of the first position and the second position, as discussed above, to facilitate identification of which combustor can head end is receiving fuel from the fuel leak. Initially controlling the actuators in groups may reduce the duration of the identification process.

While groups of two actuators/crossover valves is disclosed above, in other embodiments, each group may include additional actuators/crossover valves. For example, in certain embodiments, each group may include 3, 4, 5, 6, or more actuators/crossover valves (e.g., depending on the number of combustor cans). Furthermore, in certain embodiments, the controller 130 may sequentially instruct successive groups of actuators to drive the respective crossover valves to the other of the first position and the second position. In response to identifying a change in detection of the hydrocarbon concentration that is greater than the hydrocarbon threshold value among the first and second sensor assemblies, the controller 130 may sequentially instruct a sub-group of actuators to drive the respective crossover valves to the other of the first position and the second position. Then, in response to identifying a change in detection of the hydrocarbon concentration that is greater than the hydrocarbon threshold value among the first and second sensor assemblies, the controller may sequentially instruct each actuator within the sub-group to drive the respective crossover valve to the other of the first position and the second position to facilitate identification of which combustor can head end is receiving fuel from the fuel leak.

In the illustrated embodiment, two sensor assemblies 136, 138 are used to identify the head end 17 that is receiving leaked fuel. Accordingly, the cost of the gas turbine system 10 may be reduced, as compared to a gas turbine system that utilizes a fluid monitoring system including one sensor assembly for each combustor can. In addition, because the sensor assemblies 136, 138 are continuously/substantially continuously monitoring the head ends 17 of the combustor cans 15 for fuel, a fuel leak within the gas turbine system 10 may be detected almost immediately, as compared to a fluid monitoring system that cyclically directs air from each can to a single sensor assembly.

Furthermore, the two sensor assemblies 136, 138 provide redundancy within the fluid monitoring system, as compared to a single sensor assembly configuration. For example, in response to failure of one sensor assembly, the controller may periodically cycle each crossover valve between the first and second positions to enable the working sensor assembly to detect fuel leakage into the head end of each combustor can. In addition, because air flows from the head end of each combustor can to a manifold regardless of the positions of the crossover valves, the controller may detect fuel leaking into the head end of each combustor can even if one or more of the crossover valves become fixed in the first position or the second position (e.g., due to failure of the respective actuator(s)). Furthermore, because the same number of combustor cans is fluidly coupled to each manifold regardless of the position of each crossover valve, the fluid flow rate through each manifold may be substantially constant during operation of the gas turbine system, thereby increasing the accuracy of the sensor assemblies.

While the fluid monitoring system includes six crossover valves in the illustrated embodiment, in other embodiments, the fluid monitoring system may include more or fewer crossover valves (e.g., 4, 8, 10, 12, 14, 16, 18, 20, etc.). For example, in certain embodiments, the number of crossover valves may be half the number of combustor cans. Furthermore, while each crossover valve is a two-position four-way crossover valve in the illustrated embodiment, in other embodiments, at least one crossover valve may have additional positions (e.g., 3, 4, 5, etc.) and/or additional fluid connections (e.g., 6, 8, 10, etc.). For example, at least one crossover valve may have three positions (e.g., in which the crossover valve is configured to block flow through the crossover valve while the crossover valve is in the third position). Furthermore, in certain embodiments, at least one crossover valve may be an eight-way crossover valve (e.g., fluidly coupled to four combustor cans and configured to concurrently redirect the output of each combustor can with a single transition/movement).

Each sensor assembly 136, 138 may include one sensor or multiple sensors (e.g., 2, 3, 4, 5, 6, or more). For example, in certain embodiments, at least one sensor assembly may include multiple hydrocarbon sensors (e.g., to provide redundant hydrocarbon concentration detection). In addition, while each sensor assembly 136, 138 in the illustrated embodiment is configured to detect hydrocarbon concentration, in other embodiments, at least one sensor assembly may be configured to detect other and/or additional property/properties of the air (e.g., alone or in combination with hydrocarbon concentration). For example, at least one sensor assembly 136, 138 may include one or more sensors configured to detect hydrocarbon concentration, a temperature of the air, a flow rate of the air, a concentration of particulate material within the air, a concentration of other chemical(s) within the air, other suitable property/properties of the air, or a combination thereof (e.g., including multiple sensors to detect the same property).

Furthermore, while the fluid flowing through the manifolds and monitored by the sensor assemblies includes air (e.g., mostly air with possibly small amounts of hydrocarbons) in the illustrated embodiment, in other embodiments, the fluid may include any other suitable type(s) of fluid(s), including liquid(s) (e.g., water, liquid fuel, etc.) and/or gas/gases (e.g., gaseous fuel, combustion gases, etc.).

Moreover, while the fluid monitoring system 38 is used to monitor air within combustor can head ends in the illustrated embodiment, in other embodiments, the fluid monitoring system 38 may be used to monitor fluid(s) from any other suitable fluid sources, such as monitoring water quality from multiple water sources, monitoring fuel quality from multiple fuel sources, monitoring chemicals from multiple chemical sources for various elements/compounds, among other suitable applications.

Figure 4:
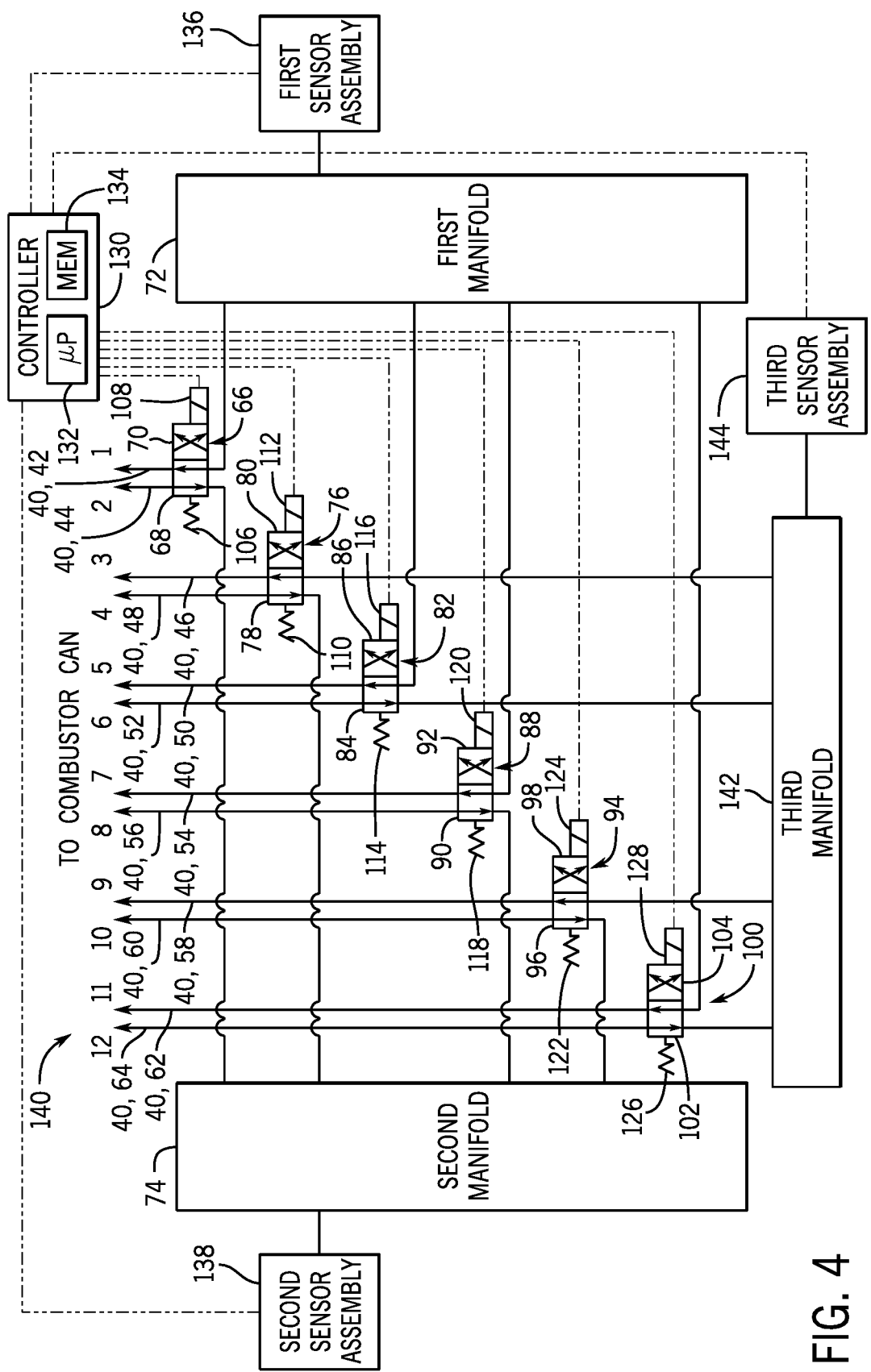
FIG. 4 is a schematic diagram of another embodiment of a fluid monitoring system that may be fluidly coupled to the combustion section of FIG. 2, in accordance with an aspect of the present disclosure.

FIG. 4 is a schematic diagram of another embodiment of a fluid monitoring system 140 that may be fluidly coupled to the combustion section 14 of FIG. 2 and that includes three manifolds and three corresponding sensor assemblies. As illustrated, the first crossover valve 66 is fluidly coupled to the first fluid passage 42 and to the second fluid passage 44. While the first crossover valve 66 is in the first position 68, the first crossover valve 66 establishes a fluid connection between the first fluid passage 42 and the first manifold 72, and the first crossover valve 66 establishes a fluid connection between the second fluid passage 44 and the second manifold 74. In addition, while the first crossover valve 66 is in the second position 70, the first crossover valve 66 establishes a fluid connection between the first fluid passage 42 and the second manifold 74, and the first crossover valve 66 establishes a fluid connection between the second fluid passage 44 and the first manifold 72. Accordingly, the first crossover valve 66 is configured to direct the air from combustor can 1 (e.g., respective first fluid source, respective first combustor can) to the first manifold 72 and to direct the air from combustor can 2 (e.g., respective second fluid source, respective second combustor can) to the second manifold 74 while the first crossover valve 66 is in the first position 68, and to direct the air from combustor can 1 to the second manifold 74 and to direct the air from combustor can 2 to the first manifold 72 while the first crossover valve 66 is in the second position 70.

Furthermore, the second crossover valve 76 is fluidly coupled to the third fluid passage 46 and to the fourth fluid passage 48. While the second crossover valve 76 is in the first position 78, the second crossover valve 76 establishes a fluid connection between the third fluid passage 46 and a third manifold 142, and the second crossover valve 76 establishes a fluid connection between the fourth fluid passage 48 and the second manifold 74. In addition, while the second crossover valve 76 is in the second position 80, the second crossover valve 76 establishes a fluid connection between the third fluid passage 46 and the second manifold 74, and the second crossover valve 76 establishes a fluid connection between the fourth fluid passage 48 and the third manifold 142. Accordingly, the second crossover valve 76 is configured to direct the air from combustor can 3 (e.g., respective first fluid source, respective first combustor can) to the third manifold 142 and to direct the air from combustor can 4 (e.g., respective second fluid source, respective second combustor can) to the second manifold 74 while the second crossover valve 76 is in the first position 78, and to direct the air from combustor can 3 to the second manifold 74 and to direct the air from combustor can 4 to the third manifold 142 while the second crossover valve 76 is in the second position 80.

In addition, the third crossover valve 82 is fluidly coupled to the fifth fluid passage 50 and to the sixth fluid passage 52. While the third crossover valve 82 is in the first position 84, the third crossover valve 82 establishes a fluid connection between the fifth fluid passage 50 and the first manifold 72, and the third crossover valve 82 establishes a fluid connection between the sixth fluid passage 52 and the third manifold 142. In addition, while the third crossover valve 82 is in the second position 86, the third crossover valve 82 establishes a fluid connection between the fifth fluid passage 50 and the third manifold 142, and the third crossover valve 82 establishes a fluid connection between the sixth fluid passage 52 and the first manifold 72. Accordingly, the third crossover valve 82 is configured to direct the air from combustor can 5 (e.g., respective first fluid source, respective first combustor can) to the first manifold 72 and to direct the air from combustor can 6 (e.g., respective second fluid source, respective second combustor can) to the third manifold 142 while the third crossover valve 82 is in the first position 84, and to direct the air from combustor can 5 to the third manifold 142 and to direct the air from combustor can 6 to the first manifold 72 while the third crossover valve 82 is in the second position 86.

The fourth crossover valve 88 is fluidly coupled to the seventh fluid passage 54 and to the eighth fluid passage 56. While the fourth crossover valve 88 is in the first position 90, the fourth crossover valve 88 establishes a fluid connection between the seventh fluid passage 54 and the first manifold 72, and the fourth crossover valve 88 establishes a fluid connection between the eighth fluid passage 56 and the second manifold 74. In addition, while the fourth crossover valve 88 is in the second position 92, the fourth crossover valve 88 establishes a fluid connection between the seventh fluid passage 54 and the second manifold 74, and the fourth crossover valve 88 establishes a fluid connection between the eighth fluid passage 56 and the first manifold 72. Accordingly, the fourth crossover valve 88 is configured to direct the air from combustor can 7 (e.g., respective first fluid source, respective first combustor can) to the first manifold 72 and to direct the air from combustor can 8 (e.g., respective second fluid source, respective second combustor can) to the second manifold 74 while the fourth crossover valve 88 is in the first position 90, and to direct the air from combustor can 7 to the second manifold 74 and to direct the air from combustor can 8 to the first manifold 72 while the fourth crossover valve 88 is in the second position 92.

In addition, the fifth crossover valve 94 is fluidly coupled to the ninth fluid passage 58 and to the tenth fluid passage 60. While the fifth crossover valve 94 is in the first position 96, the fifth crossover valve 94 establishes a fluid connection between the ninth fluid passage 58 and the third manifold 142, and the fifth crossover valve 94 establishes a fluid connection between the tenth fluid passage 60 and the second manifold 74. In addition, while the fifth crossover valve 94 is in the second position 98, the fifth crossover valve 94 establishes a fluid connection between the ninth fluid passage 58 and the second manifold 74, and the fifth crossover valve 94 establishes a fluid connection between the tenth fluid passage 60 and the third manifold 142. Accordingly, the fifth crossover valve 94 is configured to direct the air from combustor can 9 (e.g., respective first fluid source, respective first combustor can) to the third manifold 142 and to direct the air from combustor can 10 (e.g., respective second fluid source, respective second combustor can) to the second manifold 74 while the fifth crossover valve 94 is in the first position 96, and to direct the air from combustor can 9 to the second manifold 74 and to direct the air from combustor can 10 to the third manifold 142 while the fifth crossover valve 94 is in the second position 98.

Furthermore, the sixth crossover valve 100 is fluidly coupled to the eleventh fluid passage 62 and to the twelfth fluid passage 64. While the sixth crossover valve 100 is in the first position 102, the sixth crossover valve 100 establishes a fluid connection between the eleventh fluid passage 62 and the first manifold 72, and the sixth crossover valve 100 establishes a fluid connection between the twelfth fluid passage 64 and the third manifold 142. In addition, while the sixth crossover valve 100 is in the second position 104, the sixth crossover valve 100 establishes a fluid connection between the eleventh fluid passage 62 and the third manifold 142, and the sixth crossover valve 100 establishes a fluid connection between the twelfth fluid passage 64 and the first manifold 72. Accordingly, the sixth crossover valve 100 is configured to direct the air from combustor can 11 (e.g., respective first fluid source, respective first combustor can) to the first manifold 72 and to direct the air from combustor can 12 (e.g., respective second fluid source, respective second combustor can) to the third manifold 142 while the sixth crossover valve 100 is in the first position 102, and to direct the air from combustor can 11 to the third manifold 142 and to direct the air from combustor can 12 to the first manifold 72 while the sixth crossover valve 100 is in the second position 104.

In the illustrated embodiment, the third manifold 142 is fluidly coupled to a third sensor assembly 144. The third sensor assembly 144 is configured to output a signal indicative of at least one fluid property of a fluid. As previously discussed, in certain embodiments, the at least one fluid property includes a concentration of hydrocarbons within the fluid (e.g., the air received from the head ends of the combustor cans). As illustrated, the controller 130 is communicatively coupled to the third sensor assembly 144. The controller is configured to determine a first value of the at least one fluid property (e.g., hydrocarbon concentration) of the fluid (e.g., air) flowing through the first manifold 72 based on feedback from the first sensor assembly 136, the controller is configured to determine a second value of the at least one fluid property (e.g., hydrocarbon concentration) of the fluid (e.g., air) flowing through the second manifold 74 based on feedback from the second sensor assembly 138, and the controller is configured to determine a third value of the at least one fluid property (e.g., hydrocarbon concentration) of the fluid (e.g., air) flowing through the third manifold 142 based on feedback from the third sensor assembly 144. In addition, the controller is configured to compare each value of the at least one fluid property (e.g., hydrocarbon concentration) to a threshold valve to determine whether the value of the at least one fluid property exceeds the threshold value.

By way of example, during operation of the gas turbine system, the controller 130 may detect fuel leakage into the head ends of the combustor cans. For example, while a first set of crossover valves (e.g., the first crossover valve 66 and the fourth crossover valve 88) are in the first position, air flows from the respective first combustor cans to the first sensor assembly 136 via the first manifold 72, and air flows from the respective second combustor cans to the second sensor assembly 138 via the second manifold 74. In the illustrated embodiment, the respective first combustor cans include combustor cans 1 and 7, and the respective second combustor cans include combustor cans 2 and 8. In addition, while a second set of crossover valves (e.g., the second crossover valve 76 and the fifth crossover valve 94) are in the first position, air flows from the respective first combustor cans to the third sensor assembly 144 via the third manifold 142, and air flows from the respective second combustor cans to the second sensor assembly 138 via the second manifold 74. In the illustrated embodiment, the respective first combustor cans include combustor cans 3 and 9, and the respective second combustor cans include combustor cans 4 and 10. Furthermore, while a third set of crossover valves (e.g., the third crossover valve 82 and the sixth crossover valve 100) are in the first position, air flows from the respective first combustor cans to the first sensor assembly 136 via the first manifold 72, and the air flows from the respective second combustor cans to the third sensor assembly 144 via the third manifold 142. In the illustrated embodiment, the respective first combustor cans include combustor cans 5 and 11, and the respective second combustor cans include combustor cans 6 and 12.

Accordingly, while the crossover valves are in the first position, air flows from combustor cans 1, 5, 7, and 11 to the first manifold 72; air flows from combustor cans 2, 4, 8, and 10 to the second manifold 74; and air flows from combustor cans 3, 6, 9, and 12 to the third manifold 142. As such, the first sensor assembly 136 monitors the concentration of hydrocarbons within the head ends of combustor cans 1, 5, 7, and 11, the second sensor assembly 138 monitors the concentration of hydrocarbons within the head ends of combustor cans 2, 4, 8, and 10, and the third sensor assembly 144 monitors the concentration of hydrocarbons within the head ends of combustor cans 3, 6, 9, and 12. If the controller 130 determines that the first value of the hydrocarbon concentration within the first manifold 72 is greater than a hydrocarbon threshold value, the controller 130 may identify a fuel leak within one of combustor cans 1, 5, 7, and 11. If the controller 130 determines that the second value of the hydrocarbon concentration within the second manifold 74 is greater than the hydrocarbon threshold value, the controller 130 may identify a fuel leak within one of combustor cans 2, 4, 8, and 10. If the controller 130 determines that the third value of the hydrocarbon concentration within the third manifold 142 is greater than the hydrocarbon threshold value, the controller 130 may identify a fuel leak within one of combustor cans 3, 6, 9, and 12. Accordingly, the controller 130 may continuously/substantially continuously (e.g., within the sampling rate of the sensor assemblies/controller) monitor the head ends of the combustor cans for fuel leakage.

In the illustrated embodiment, the controller 130 is configured to control the actuators to identify the combustor can head end that is receiving fuel from the fuel leak. For example, in response to determining that fuel/hydrocarbons are present within one head end (e.g., determining that the first value of the hydrocarbon concentration, the second value of the hydrocarbon concentration, or the third value of the hydrocarbon concentration is greater than the hydrocarbon threshold value), the controller 130 may sequentially instruct each actuator to drive the respective crossover valve to the other of the first position and the second position. In addition, the controller may identify which combustor can head end is receiving fuel from the fuel leak in response to identifying a change in detection of the hydrocarbon concentration that is greater than the hydrocarbon threshold value among the first, second, and third sensor assemblies.

By way of example, the head end of combustor can 3 may receive fuel from a fuel leak. Accordingly, while the crossover valves are in the first position, the controller 130 may determine that the third value of the hydrocarbon concentration within the third manifold 142 is greater than the hydrocarbon threshold value. The controller 130 may then sequentially instruct each actuator to drive the respective crossover valve from the first position to the second position to identify whether the leak is present in combustor can 3, 6, 9, or 12, which are the combustor cans coupled to the third manifold 142 while the respective crossover valves are in the first position.

For example, the controller 130 may instruct the first solenoid 108 to drive the first crossover valve 66 from the first position 68 to the second position 70, thereby directing the air from combustor can 1 to the second manifold 74 and directing the air from combustor can 2 to the first manifold 72. In this example, because fuel is not leaking into combustor can 1 or combustor can 2, the controller 130 may not identify a change in detection of the hydrocarbon concentration that is greater than the hydrocarbon threshold value among the first and second sensor assemblies.

Next, the controller 130 may instruct the second solenoid 112 to drive the second crossover valve 76 from the first position 78 to the second position 80, thereby directing the air from combustor can 3 to the second manifold 74 and directing the air from combustor can 4 to the third manifold 142. Because fuel is leaking into combustor can 3, the controller 130 may identify a change in detection of the hydrocarbon concentration that is greater than the hydrocarbon threshold value among the first, second, and third sensor assemblies. Specifically, after driving the second crossover valve 76 to the second position 80, the controller 130 may determine that the third value of the hydrocarbon concentration within the third manifold 142 is less than the hydrocarbon threshold value, and the second value of the hydrocarbon concentration within the second manifold 74 is greater than the hydrocarbon threshold value. Because the flow of air from the head end of combustor can 3 switched from flowing into the third manifold 142 to flowing into the second manifold 74 in response to changing the position of the second crossover valve 76, the controller may identify that fuel is leaking into combustor can 3.

Furthermore, in certain embodiments, the controller 130 may only sequentially transition the actuators coupled to the crossover valves that are fluidly coupled to the sensor assembly that detects the hydrocarbon concentration greater than the hydrocarbon threshold value. For example, the head end of combustor can 3 may receive fuel from a fuel leak. Accordingly, while the crossover valves are in the first position, the controller 130 may determine that the third value of the hydrocarbon concentration within the third manifold 142 is greater than the hydrocarbon threshold value. The controller 130 may then sequentially transition each actuator coupled to a respective crossover valve that is fluidly coupled to the third manifold 142. For example, the controller 130 may instruct the second solenoid 112 to drive the second crossover valve 76 from the first position 78 to the second position 80, thereby directing the air from combustor can 3 to the second manifold 74 and directing the air from combustor can 4 to the third manifold 142.

Because fuel is leaking into combustor can 3, the controller 130 may identify a change in detection of the hydrocarbon concentration that is greater than the hydrocarbon threshold value among the second and third sensor assemblies. For example, the controller 130 may determine that the third value of the hydrocarbon concentration within the third manifold 142 is less than the hydrocarbon threshold value, and the second value of the hydrocarbon concentration within the second manifold is greater than the hydrocarbon threshold value. Since the flow of air from the head end of combustor can 3 switched from flowing into the third manifold 142 to flowing into the second manifold 74 in response to changing the position of the second crossover valve 76, the controller 130 may identify that fuel is leaking into combustor can 3. Because the controller 130 only transitions the actuators coupled to the crossover valves that are fluidly coupled to the sensor assembly that detects the hydrocarbon concentration greater than the hydrocarbon threshold value, the location of the leak may be identified more quickly than transitioning each valve sequentially, as discussed above.

By way of further example, in response to determining that fuel/hydrocarbons are present within one head end (e.g., determining that the first value of the hydrocarbon concentration, the second value of the hydrocarbon concentration, or the third value of the hydrocarbon concentration is greater than the hydrocarbon threshold value), the controller 130 may sequentially instruct successive groups of actuators to drive the respective crossover valves to the other of the first position and the second position. In addition, the controller 130 may identify which combustor can head end is receiving fuel from the fuel leak in response to identifying a change in detection of the hydrocarbon concentration that is greater than the hydrocarbon threshold value among the first, second, and third sensor assemblies 136, 138, 144.

For instance, the head end of combustor can 3 may receive fuel from a fuel leak. Accordingly, while the crossover valves are in the first position, the controller 130 may determine that the third value of the hydrocarbon concentration within the third manifold 142 is greater than the hydrocarbon threshold value. The controller 130 may then sequentially instruct groups of two actuators to drive the respective crossover valves from the first position to the second position. For example, the controller 130 may instruct the first solenoid 108 to drive the first crossover valve 66 from the first position 68 to the second position 70, thereby directing the air from combustor can 1 to the second manifold 74 and directing the air from combustor can 2 to the first manifold 72. The controller 130 may also instruct the second solenoid 112 to drive the second crossover valve 76 from the first position 78 to the second position 80, thereby directing the air from combustor can 3 to the second manifold 74 and directing the air from combustor can 4 to the third manifold 142.

Because fuel is leaking into combustor can 3, the controller 130 may identify a change in detection of the hydrocarbon concentration that is greater than the hydrocarbon threshold value among the second and third sensor assemblies. For example, the controller 130 may determine that the third value of the hydrocarbon concentration within the third manifold 142 is less than the hydrocarbon threshold value, and the second value of the hydrocarbon concentration within the second manifold 74 is greater than the hydrocarbon threshold value. Because the change in detection of the hydrocarbon concentration that is greater than the hydrocarbon threshold value is among the second and third sensor assemblies, as compared to the first and second sensor assemblies, the controller 130 may identify that the fuel is leaking into combustor can 3 or 4. In addition, because the detection of the hydrocarbon concentration that is greater than the hydrocarbon threshold value changes from the third sensor assembly 144 to the second sensor assembly 138 in response to transitioning the second crossover valve 76 to the second position 80, the controller may identify that the fuel is leaking into combustor can 3. Because the controller may identify the location of the fuel leak among four combustor cans with a single transition of two valves, the location of the leak may be identified more quickly than transitioning the individual valves sequentially, as discussed above.

While groups of two actuators/crossover valves are disclosed above, in other embodiments, each group may include additional actuators/crossover valves. For example, in certain embodiments, each group may include 3, 4, 5, 6, or more actuators/crossover valves. Furthermore, in certain embodiments, the controller 130 may sequentially instruct successive groups of actuators to drive the respective crossover valves to the other of the first position and the second position. In response to identifying a change in detection of the hydrocarbon concentration that is greater than the hydrocarbon threshold value among the first, second, and third sensor assemblies, the controller 130 may sequentially instruct individual actuators within the group to drive the respective crossover valves to the other of the first position and the second position to facilitate identification of which combustor can head end is receiving fuel from the fuel leak. In addition, in certain embodiments, the controller 130 may sequentially instruct successive groups of actuators to drive the respective crossover valves to the other of the first position and the second position. In response to identifying a change in detection of the hydrocarbon concentration that is greater than the hydrocarbon threshold value among the first, second, and third sensor assemblies, the controller 130 may sequentially instruct a sub-group of actuators to drive the respective crossover valves to the other of the first position and the second position. Then, in response to identifying a change in detection of the hydrocarbon concentration that is greater than the hydrocarbon threshold value among the first, second, and third sensor assemblies, the controller 130 may sequentially instruct each actuator within the sub-group to drive the respective crossover valve to the other of the first position and the second position to facilitate identification of which combustor can head end is receiving fuel from the fuel leak.

In the illustrated embodiment, three sensor assemblies 136, 138, 144 are used to identify the head end that is receiving fuel. Accordingly, the cost of the gas turbine system may be reduced, as compared to a gas turbine system that utilizes a fluid monitoring system including one sensor assembly for each combustor can. In addition, because the sensor assemblies are continuously/substantially continuously monitoring the head ends of the combustor cans for fuel, a fuel leak within the gas turbine system may be detected almost immediately, as compared to a fluid monitoring system that cyclically directs air from each combustor can to a single sensor assembly.

Furthermore, the three sensor assemblies 136, 138, 144 provide redundancy within the fluid monitoring system, as compared to a single sensor assembly configuration. For example, in response to failure of one sensor assembly, the controller 130 may periodically cycle each crossover valve that is fluidly coupled to the non-working sensor assembly between the first and second positions to enable the two working sensor assemblies to detect fuel leakage into the head end of each combustor can. In addition, because air flows from the head end of each combustor can to a manifold regardless of the positions of the crossover valves, the controller 130 may detect fuel leaking into the head end of each combustor can even if one or more of the crossover valves become fixed in the first position or the second position (e.g., due to failure of the respective actuator(s)). Furthermore, because the same number of combustor cans are fluidly coupled to each manifold regardless of the position of each crossover valve, the fluid flow rate through each manifold may be substantially constant during operation of the gas turbine system, thereby increasing the accuracy of the sensor assemblies.

While the fluid monitoring system includes six crossover valves in the illustrated embodiment, in other embodiments, the fluid monitoring system may include more or fewer crossover valves (e.g., 4, 8, 10, 12, 14, 16, 18, 20, etc.). For example, in certain embodiments, the number of crossover valves may be half the number of combustor cans. Furthermore, while each crossover valve is a two-position four-way crossover valve in the illustrated embodiment, in other embodiments, at least one crossover valve may have additional positions (e.g., 3, 4, 5, etc.) and/or additional fluid connections (e.g., 6, 8, 10, etc.). For example, at least one crossover valve may have three positions (e.g., in which the crossover valve is configured to block flow through the crossover valve while the crossover valve is in the third position). Furthermore, in certain embodiments, at least one crossover valve may be an eight-way crossover valve (e.g., fluidly coupled to four combustor cans and configured to concurrently redirect the output of each combustor can with a single transition/movement).

In addition, while the first and fourth crossover valves 66, 88 are fluidly coupled to the first and second manifolds 72, 74, the second and fifth crossover valves 76, 94 are fluidly coupled to the second and third manifolds 74, 142, and the third and sixth crossover valves 82, 100 are fluidly coupled to the first and third manifolds 72, 142 in the illustrated embodiment, in other embodiments, the fluid monitoring system 140 may include a different arrangement of fluid couplings between the crossover valves and the three manifolds. Furthermore, while the fluid monitoring system 140 includes three manifolds in the illustrated embodiment, in other embodiments, the fluid monitoring system 140 may include more or fewer manifolds (e.g., 2, 4, 5, 6, or more). For example, in certain embodiments, the fluid monitoring system may be configured to monitor the head ends of 16 combustor cans. In such embodiments, the fluid monitoring system may include eight crossover valves and four manifolds, and the fluid connections between the crossover valves and the manifolds may be arranged such that each manifold receives air from four combustor cans regardless of the positions of the crossover valves.

Each sensor assembly 136, 138, 144 may include one sensor or multiple sensors (e.g., 2, 3, 4, 5, 6, or more). For example, in certain embodiments, at least one sensor assembly may include multiple hydrocarbon sensors (e.g., to provide redundant hydrocarbon concentration detection). In addition, while each sensor assembly 136, 138, 144 is configured to detect hydrocarbon concentration in the illustrated embodiment, in other embodiments, at least one sensor assembly may be configured to detect other and/or additional property/properties of the air (e.g., alone or in combination with hydrocarbon concentration). For example, at least one sensor assembly may include one or more sensors configured to detect hydrocarbon concentration, a temperature of the air, a flow rate of the air, a concentration of particulate material within the air, a concentration of other chemical(s) within the air, other suitable property/properties of the air, or a combination thereof (e.g., including multiple sensors to detect the same property). Furthermore, while the fluid flowing through the manifolds and monitored by the sensor assemblies includes air (e.g., mostly air with possibly small amounts of hydrocarbons) in the illustrated embodiment, in other embodiments, the fluid may include any other suitable type(s) of fluid(s), including liquid(s) (e.g., water, liquid fuel, etc.) and/or gas/gases (e.g., gaseous fuel, combustion gases, etc.). Moreover, while the fluid monitoring system 140 is used to monitor air within combustor can head ends in the illustrated embodiment, in other embodiments, the fluid monitoring system 140 may be used to monitor fluid(s) from any other suitable fluid sources, such as monitoring water quality from multiple water sources, monitoring fuel quality from multiple fuel sources, monitoring chemicals from multiple chemical sources for various elements/compounds, among other suitable applications.

Furthermore, while the crossover valves are represented as separate elements in the schematic diagrams of FIGS. 3 and 4, in certain embodiments, at least two crossover valves may be disposed within a common housing to form a valve assembly. For example, a single valve assembly may include a housing, and each crossover valve may be disposed within the housing. Furthermore, in certain embodiments, one or more crossover valves may be separate element(s) (e.g., each having a respective housing). In addition, in certain embodiments, at least one crossover valve within the fluid monitoring system of FIG. 3 and/or within the fluid monitoring system of FIG. 4 is configured to split the flow of air between the manifolds fluidly coupled to the crossover valve while the crossover valve is in an intermediate position. Accordingly, as the crossover valve transitions between positions, the flow of air continuously/substantially continuously transitions between the manifolds fluidly coupled to the crossover valve.

Figure 5:
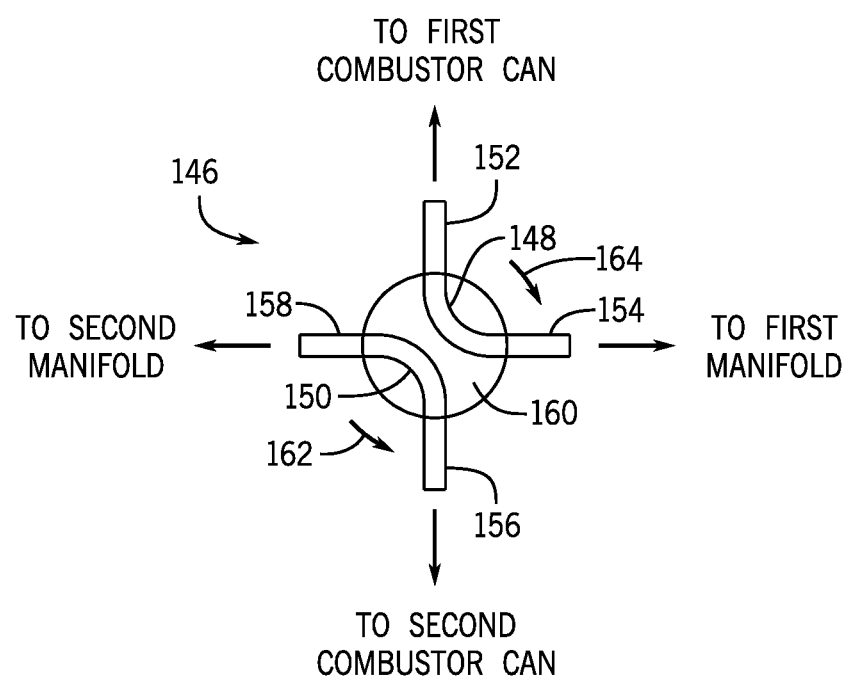
FIG. 5 is a schematic diagram of a rotary crossover valve that may be employed within the fluid monitoring system of FIG. 3 and/or within the fluid monitoring system of FIG. 4, in accordance with an aspect of the present disclosure.

FIG. 5 is a schematic diagram of a rotary crossover valve 146 that may be employed within the fluid monitoring system of FIG. 3 and/or within the fluid monitoring system of FIG. 4. In the illustrated embodiment, the rotary crossover valve 146 includes a first fluid passage 148 and a second fluid passage 150. While the rotary crossover valve 146 is in the illustrated first position, the first fluid passage 148 fluidly couples a first inlet 152 (e.g., which is fluidly coupled to a respective first combustor can) to a first outlet 154 (e.g., which is fluidly coupled to the first manifold). In addition, while the rotary crossover valve 146 is in the illustrated first position, the second fluid passage 150 fluidly couples a second inlet 156 (e.g., which is fluidly coupled to a respective second combustor can) to a second outlet 158 (e.g., which is fluidly coupled to the second manifold). As illustrated, the first fluid passage 148 and the second fluid passage 150 extend through a rotor 160 of the rotary crossover valve 146.

Rotation of the rotor 160 through an angle of 90 degrees in a first rotational direction 162 (e.g., counter-clockwise) causes the first fluid passage 148 to fluidly couple the first inlet 152 to the second outlet 158 (e.g., establishing a fluid connection between the respective first combustor can and the second manifold) and causes the second fluid passage 150 to fluidly couple the second inlet 156 to the first outlet 154 (e.g., establishing a fluid connection between the respective second combustor can and the first manifold). Furthermore, rotation of the rotor 160 through an angle of 90 degrees in a second rotation direction 164 (e.g., clockwise) causes the first fluid passage 148 to fluidly couple the second inlet 156 to the first outlet 154 (e.g., establishing a fluid connection between the respective second combustor can and the first manifold) and causes the second fluid passage 150 to fluidly couple the first inlet 152 to the second outlet 158 (e.g., establishing a fluid connection between the respective first combustor can and the second manifold). Accordingly, the rotor 160 may be rotated in either rotation direction to transition the rotatory crossover valve 146 to the second position. The illustrated rotary crossover valve may be utilized for any or all of the crossover valves within the fluid monitoring system 38 of FIG. 3 and/or within the fluid monitoring system 140 of FIG. 4. Furthermore, in certain embodiments, multiple rotary crossover valves may be disposed within a housing (e.g., cylindrical housing) to form a crossover valve assembly.

Figure 6:
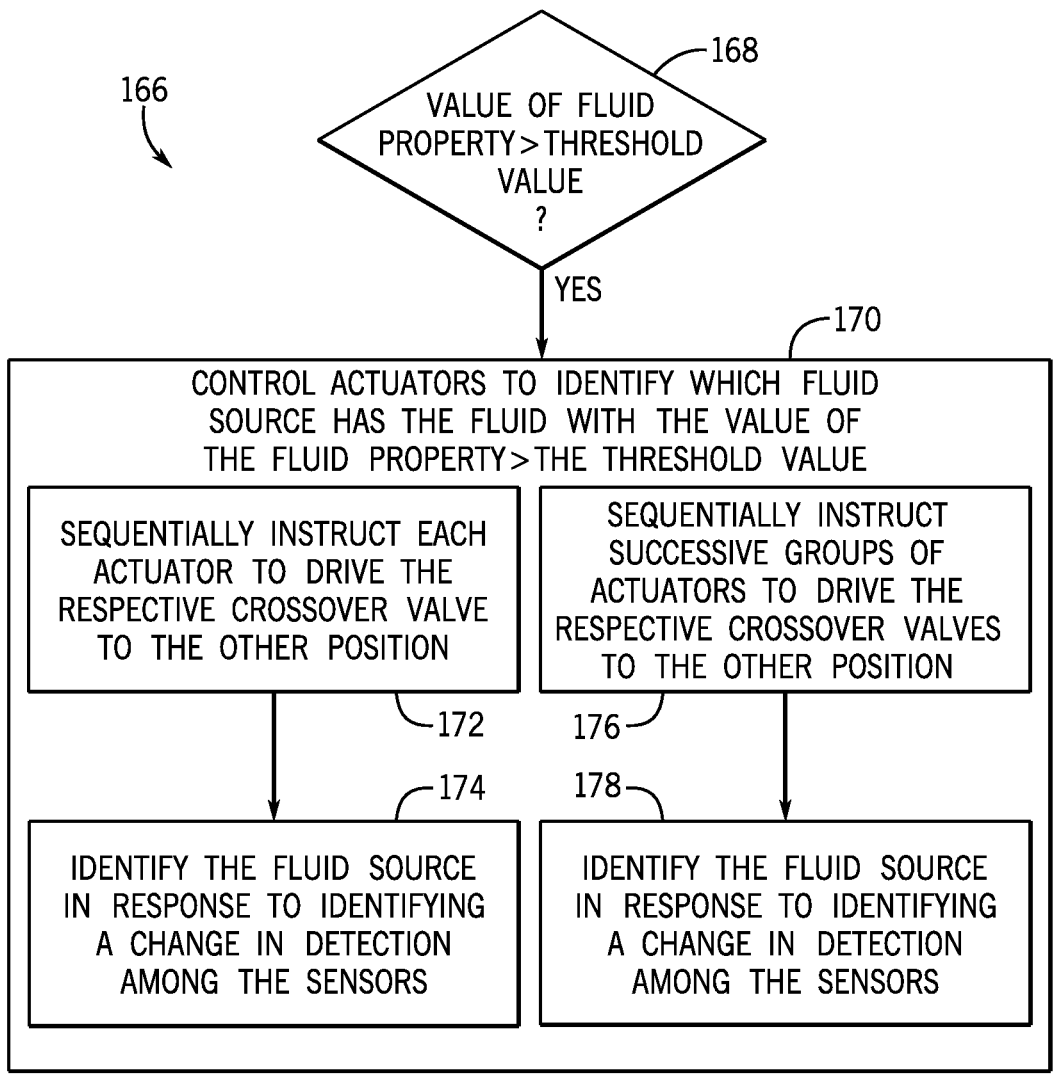
FIG. 6 is a flow diagram of an embodiment of a method for monitoring a fluid, in accordance with an aspect of the present disclosure.

FIG. 6 is a flow diagram of an embodiment of a method 166 for monitoring a fluid. First, as represented by block

168, a determination is made regarding whether a value of at least one fluid property (e.g., hydrocarbon concentration) is greater than a threshold value (e.g., hydrocarbon threshold value). In response to determining that the value of the at least one fluid property is greater than the threshold value, multiple actuators are controlled to identify which fluid source has the fluid with the value of the at least one fluid property greater than the threshold value, as represented by block 170. As previously discussed, each actuator is configured to drive a respective crossover valve between the first position and the second position. In addition, each crossover valve is configured to direct the fluid (e.g., air) from a respective first fluid source (e.g., combustion can) to the first manifold and to direct the fluid from a respective second fluid source (e.g., combustion can) to the second manifold while the crossover valve is in the first position, and to direct the fluid from the respective first fluid source to the second manifold and to direct the fluid from the respective second fluid source to the first manifold while the crossover valve is in the second position. Furthermore, the first manifold is configured to receive the fluid and to direct the fluid to the first sensor assembly, and the second manifold is configured to receive the fluid and to direct the fluid to the second sensor assembly.

In certain embodiments, controlling the actuators to identify which fluid source has the fluid with the value of the at least one fluid property greater than the threshold value includes sequentially instructing each actuator to drive the respective crossover valve to the other of the first position and the second position, as represented by block 172. The fluid source that has the fluid with the value of the at least one fluid property greater than the threshold value is identified in response to identifying a change in detection of the value of the at least one fluid property that is greater than the threshold value among the first and second sensor assemblies, as represented by block 174. Alternatively or additionally, in certain embodiments, controlling the actuators to identify which fluid source has the fluid with the value of the at least one fluid property greater than the threshold value includes sequentially instructing successive groups of actuators to drive the respective crossover valves to the other of the first position and the second position, as represented by block 176. The fluid source that has the fluid with the value of the at least one fluid property greater than the threshold value is identified in response to identifying a change in detection of the value of the at least one fluid property that is greater than the threshold value among the first and second sensor assemblies, as represented by block 178.

The steps of the method 166 may be performed in the order disclosed herein or in any other suitable order. In addition, in certain embodiments, the method 166 is performed by the controller 130 of the fluid monitoring system 38, 140. However, in other embodiments, the method 166 may be performed by any other suitable controller, such as a gas turbine system controller.

This written description uses examples to disclose the subject matter, including the best mode, and also to enable any person skilled in the art to practice the disclosed subject matter, including making and using any devices or systems and performing any incorporated methods. The patentable scope of the subject matter is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A fluid monitoring system, comprising:
a first sensor assembly configured to detect at least one fluid property of a fluid;
a second sensor assembly configured to detect the at least one fluid property of the fluid;
a first manifold configured to receive the fluid and to direct the fluid to the first sensor assembly;
a second manifold configured to receive the fluid and to direct the fluid to the second sensor assembly;
a plurality of crossover valves, wherein each crossover valve of the plurality of crossover valves is configured to direct the fluid from a respective first fluid source to the first manifold and to direct the fluid from a respective second fluid source to the second manifold while the crossover valve is in a first position, and to direct the fluid from the respective first fluid source to the second manifold and to direct the fluid from the respective second fluid source to the first manifold while the crossover valve is in a second position;
a plurality of actuators, wherein each actuator of the plurality of actuators is configured to drive a respective crossover valve of the plurality of crossover valves between the first and second positions; and
a controller comprising a memory and a processor, wherein the controller is communicatively coupled to the plurality of actuators, to the first sensor assembly, and to the second sensor assembly;
wherein the controller, in response to determining that a value of the at least one fluid property is greater than a threshold value, is configured to control the plurality of actuators to identify which fluid source has the fluid with the value of the at least one fluid property greater than the threshold value.

2. The fluid monitoring system of claim 1, wherein the at least one fluid property comprises a concentration of hydrocarbons within the fluid.

3. The fluid monitoring system of claim 1, wherein at least one of the plurality of crossover valves comprises a rotary crossover valve.

4. The fluid monitoring system of claim 1, wherein at least one of the plurality of crossover valves comprises a four-way crossover valve.

5. The fluid monitoring system of claim 1, comprising:
a third sensor assembly configured to detect the at least one fluid property of the fluid;
a third manifold configured to receive the fluid and to direct the fluid to the third sensor assembly; and
a second crossover valve configured to direct the fluid from a respective first fluid source to the first manifold and to direct the fluid from a respective second fluid source to the third manifold while the second crossover valve is in a first position, and to direct the fluid from the respective first fluid source to the third manifold and to direct the fluid from the respective second fluid source to the first manifold while the second crossover valve is in a second position; and
a second actuator configured to drive the second crossover valve between the first and second positions;
wherein the second actuator and the third sensor assembly are communicatively coupled to the controller, and the controller, in response to determining that the value of the at least one fluid property is greater than the threshold value, is configured to control the plurality of actuators and the second actuator to identify which fluid source has the fluid with the value of the at least one fluid property greater than the threshold value.

6. The fluid monitoring system of claim 5, comprising:
a third crossover valve configured to direct the fluid from a respective first fluid source to the third manifold and to direct the fluid from a respective second fluid source to the second manifold while the third crossover valve is in a first position, and to direct the fluid from the respective first fluid source to the second manifold and to direct the fluid from the respective second fluid source to the third manifold while the third crossover valve is in a second position; and
a third actuator configured to drive the third crossover valve between the first and second positions;
wherein the third actuator is communicatively coupled to the controller, and the controller, in response to determining that the value of the at least one fluid property is greater than the threshold value, is configured to control the plurality of actuators, the second actuator, and the third actuator, to identify which fluid source has the fluid with the value of the at least one fluid property greater than the threshold value.

7. The fluid monitoring system of claim 1, wherein the controller, in response to determining that the value of the at least one fluid property is greater than the threshold value, is configured to sequentially instruct each actuator of the plurality of actuators to drive the respective crossover value of the plurality of crossover valves to the other of the first position and the second position, and the controller is configured to identify which fluid source has the fluid with the value of the at least one fluid property greater than the threshold value in response to identifying a change in detection of the value of the at least one fluid property that is greater than the threshold value among the first and second sensor assemblies.

8. The fluid monitoring system of claim 1, wherein the controller, in response to determining that the value of the at least one fluid property is greater than the threshold value, is configured to sequentially instruct successive groups of actuators of the plurality of actuators to drive the respective crossover values of the plurality of crossover valves to the other of the first position and the second position, and the controller is configured to identify which fluid source has the fluid with the value of the at least one fluid property greater than the threshold value in response to identifying a change in detection of the value of the at least one fluid property that is greater than the threshold value among the first and second sensor assemblies.

9. A method of monitoring a fluid, comprising:
determining, via a controller having a memory and a processor, that a value of at least one fluid property of the fluid is greater than a threshold value; and
controlling, via the controller, a plurality of actuators to identify which fluid source has the fluid with the value of the at least one fluid property greater than the threshold value in response to determining that the value of the at least one fluid property is greater than the threshold value;
wherein each actuator of the plurality of actuators is configured to drive a respective crossover valve of a plurality of crossover valves between a first position and a second position;
wherein each crossover valve of the plurality of crossover valves is configured to direct the fluid from a respective first fluid source to a first manifold and to direct the fluid from a respective second fluid source to a second manifold while the crossover valve is in the first position, and to direct the fluid from the respective first fluid source to the second manifold and to direct the fluid from the respective second fluid source to the first manifold while the crossover valve is in the second position; and
wherein the first manifold is configured to receive the fluid and to direct the fluid to a first sensor assembly, and the second manifold is configured to receive the fluid and to direct the fluid to a second sensor assembly.

10. The method of claim 9, wherein controlling the plurality of actuators to identify which fluid source has the fluid with the value of the at least one fluid property greater than the threshold value comprises:
sequentially instructing, via the controller, each actuator of the plurality of actuators to drive the respective crossover valve of the plurality of crossover valves to the other of the first position and the second position; and
identifying, via the controller, which fluid source has the fluid with the value of the at least one fluid property greater than the threshold value in response to identifying a change in detection of the value of the at least one fluid property that is greater than the threshold value among the first and second sensor assemblies.

11. The method of claim 9, wherein controlling the plurality of actuators to identify which fluid source has the fluid with the value of the at least one fluid property greater than the threshold value comprises:
sequentially instructing, via the controller, successive groups of actuators of the plurality of actuators to drive the respective crossover valves of the plurality of crossover valves to the other of the first position and the second position; and
identifying, via the controller, which fluid source has the fluid with the value of the at least one fluid property greater than the threshold value in response to identifying a change in detection of the value of the at least one fluid property that is greater than the threshold value among the first and second sensor assemblies.

12. The method of claim 9, wherein the at least one fluid property comprises a concentration of hydrocarbons within the fluid.

13. The method of claim 9, wherein the respective first fluid source comprises a respective first combustor can of a combustion section, and the respective second fluid source comprises a respective second combustor can of the combustion section.

14. A fluid monitoring system, comprising:
a controller comprising a memory and a processor, wherein the controller is configured to:
determine that a value of at least one fluid property of a fluid is greater than a threshold value; and
control a plurality of actuators to identify which fluid source has the fluid with the value of the at least one fluid property greater than the threshold value in response to determining that the value of the at least one fluid property is greater than the threshold value;
wherein each actuator of the plurality of actuators is configured to drive a respective crossover valve of a plurality of crossover valves between a first position and a second position;
wherein each crossover valve of the plurality of crossover valves is configured to direct the fluid from a respective first fluid source to a first manifold and to direct the fluid from a respective second fluid source to a second manifold while the crossover valve is in the first position, and to direct the fluid from the respective first fluid source to the second manifold and to direct the fluid from the respective second fluid source to the first manifold while the crossover valve is in the second position; and
wherein the first manifold is configured to receive the fluid and to direct the fluid to a first sensor assembly, and the second manifold is configured to receive the fluid and to direct the fluid to a second sensor assembly.

15. The fluid monitoring system of claim 14, comprising the first sensor assembly and the second sensor assembly, wherein the controller is communicatively coupled to the first sensor assembly and to the second sensor assembly, the first sensor assembly is configured to detect the at least one fluid property of the fluid, and the second sensor assembly is configured to detect the at least one fluid property of the fluid.

16. The fluid monitoring system of claim 14, wherein the at least one fluid property comprises a concentration of hydrocarbons within the fluid.

17. The fluid monitoring system of claim 14, comprising the plurality of crossover valves.

18. The fluid monitoring system of claim 17, wherein at least one of the plurality of crossover valves comprises a rotary crossover valve.

19. The fluid monitoring system of claim 14, wherein the controller is configured to control the plurality of actuators to identify which fluid source has the fluid with the value of the at least one fluid property greater than the threshold value by:
  sequentially instructing each actuator of the plurality of actuators to drive the respective crossover valve of the plurality of crossover valves to the other of the first position and the second position; and
  identifying which fluid source has the fluid with the value of the at least one fluid property greater than the threshold value in response to identifying a change in detection of the value of the at least one fluid property that is greater than the threshold value among the first and second sensor assemblies.

20. The fluid monitoring system of claim 14, wherein the controller is configured to control the plurality of actuators to identify which fluid source has the fluid with the value of the at least one fluid property greater than the threshold value by:
  sequentially instructing successive groups of actuators of the plurality of actuators to drive the respective crossover valves of the plurality of crossover valves to the other of the first position and the second position; and
  identifying which fluid source has the fluid with the value of the at least one fluid property greater than the threshold value in response to identifying a change in detection of the value of the at least one fluid property that is greater than the threshold value among the first and second sensor assemblies.

* * * * *